US006580726B1

United States Patent
Kumpf et al.

(10) Patent No.: US 6,580,726 B1
(45) Date of Patent: Jun. 17, 2003

(54) MULTIPLE ACCESS PREVENTION FOR DATAGRAM-BASED CONTROL PROTOCOLS METHOD

(75) Inventors: David A. Kumpf, Rocklin, CA (US); Glenn R. Garcia, Grass Valley, CA (US); Dean L. Scoville, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/163,653

(22) Filed: Sep. 30, 1998

(51) Int. Cl.[7] .................................................. H04J 3/02
(52) U.S. Cl. ........................ 370/462; 709/208; 709/227
(58) Field of Search .............................. 370/462, 431, 370/437, 438, 445, 449; 709/227, 228, 203, 202, 201, 209, 217; 707/8, 9, 10

(56) References Cited

U.S. PATENT DOCUMENTS

| 5,933,580 | A | * | 8/1999 | Uda | 358/1.13 |
| 5,968,138 | A | * | 10/1999 | Clough | 710/8 |
| 6,101,555 | A | * | 8/2000 | Goshey | 709/301 |
| 6,285,658 | B1 | * | 9/2001 | Packer | 370/230 |
| 6,327,613 | B1 | * | 12/2001 | Goshey | 709/208 |

* cited by examiner

Primary Examiner—Ken Vanderpage
Assistant Examiner—Ricardo M. Pizarro

(57) ABSTRACT

A method of preventing multiple client access by datagram-based control protocols on a network having a scan peripheral and a server. The server utilizes a connectionless protocol for communicating control data and a connection oriented protocol for communicating scan data. A first client sends an open connection request to the server in an attempt to open a connection with the server. The server checks to determine if a connection with another client is currently open. Thereafter, the server rejects the open connection request in the event a connection is currently open. The server accepts the connection request and storing predetermined client information in the event a connection with another client is not currently open. The client sends a datagram-based protocol request for a predetermined action to the server. Next, the server determines if the predetermined action is a protected action and whether the request is from the client that has the currently open connection. Additionally, the server sends an error message to any client not having a currently open connection which makes a datagram-based protocol request for a protected action. The server processes a datagram-based protocol request when made by the client having a currently open connection. One of the client and the server closes the open connection upon completion of an activity.

18 Claims, 3 Drawing Sheets

MULTIPLE ACCESS PREVENTION FOR DATAGRAM-BASED CONTROL PROTOCOLS METHOD

The present invention generally relates to software and firmware, i.e., software embedded on a system, and more particularly to software and firmware for preventing multiple access of datagram-based control protocols.

Scanning peripherals, i.e., scanners, are becoming a larger portion of the peripheral industry. Users find such peripherals useful as a means of input for text, graphics and images. Many software applications now permit manipulation and use of such data. Some scanners utilize out-of-band control, such as multifunction peripheral data transfer format (MFPDTF) to control functions of the peripheral. For out-of-band control, the control commands are transmitted outside the data channel on a separate channel. Conversely, other scanners utilize in-band control, such as scanner control language (SCL). In-band scan control is accomplished via a set of in-band commands that are imbedded within the scan data stream.

Since scan data is both lengthy and contiguous, it is sensible to transmit the data using a connection-oriented protocol, such as transmission control protocol/Internet protocol (TCP/IP) or sequenced packet exchange (SPX) protocol. Unlike scan data, control data is typically comprised of a series of short request-response transactions. Thus, for a scanner with out-of-band control, it is sensible to eliminate overhead associated with establishing and terminating a connection with the scanner by using a connectionless protocols, such as simple network management protocol (SNMP), user datagram protocol (UDP), and internetwork packet exchange (IPX), for control commands.

A problem exists, however, when using a connectionless protocol for the out-of-band controlled scanners. When scanners and other peripheral devices are attached to a network, multiple clients can access the devices. Since multiple clients can access the scanning peripheral on a network, potential contention problems occur. Scanners, for example, ordinarily require setup before starting an actual scan. Contention occurs when one client sends commands to set the scanner resolution, page size, and other options in preparation for starting a scan, and at the same time another client issues similar commands to the same scanner. When the first client finally opens a data connection to start the scan job, some of the desired scan options may already have been overwritten by the second client. Nothing inherently exists in a connectionless protocol to prevent such overwriting. Similarly, one client can send commands to reset the scanner while another client's scan is in progress, and effectively abort the other client's scan job.

An object of the present invention is to provide an improved server method that utilizes a connectionless protocol for control data and a connection oriented protocol for scan data.

Another object of the present invention is to provide an improved server method that uses a connection oriented protocol to grant access to objects referenced by a connectionless protocol.

Yet another object of the present invention is to provide an improved method apparatus that handles network contention.

Other objects and advantages will become apparent upon reading the following detailed description, in conjunction with the attached drawings, in which.

TABLE OF ACRONYMS

This patent utilizes several acronyms. The following table is provided to aid the reader in determining the meaning of the several acronyms:

CPU=central processing unit.
IP=Internet protocol.
IPX=internetwork packet exchange.
MFPDTF=multifunction peripheral data transfer format.
PML=peripheral management language.
SCL=scanner control language.
SNMP=simple network management protocol.
SPX=sequenced packet exchange.
TCP=transmission control protocol.
UDP=user datagram protocol.

DETAILED DESCRIPTION

Broadly stated, the present invention is directed to an improved method adapted to use a connection oriented protocol to grant access to objects referenced by a connectionless protocol, and handle network contention.

Figure 1:
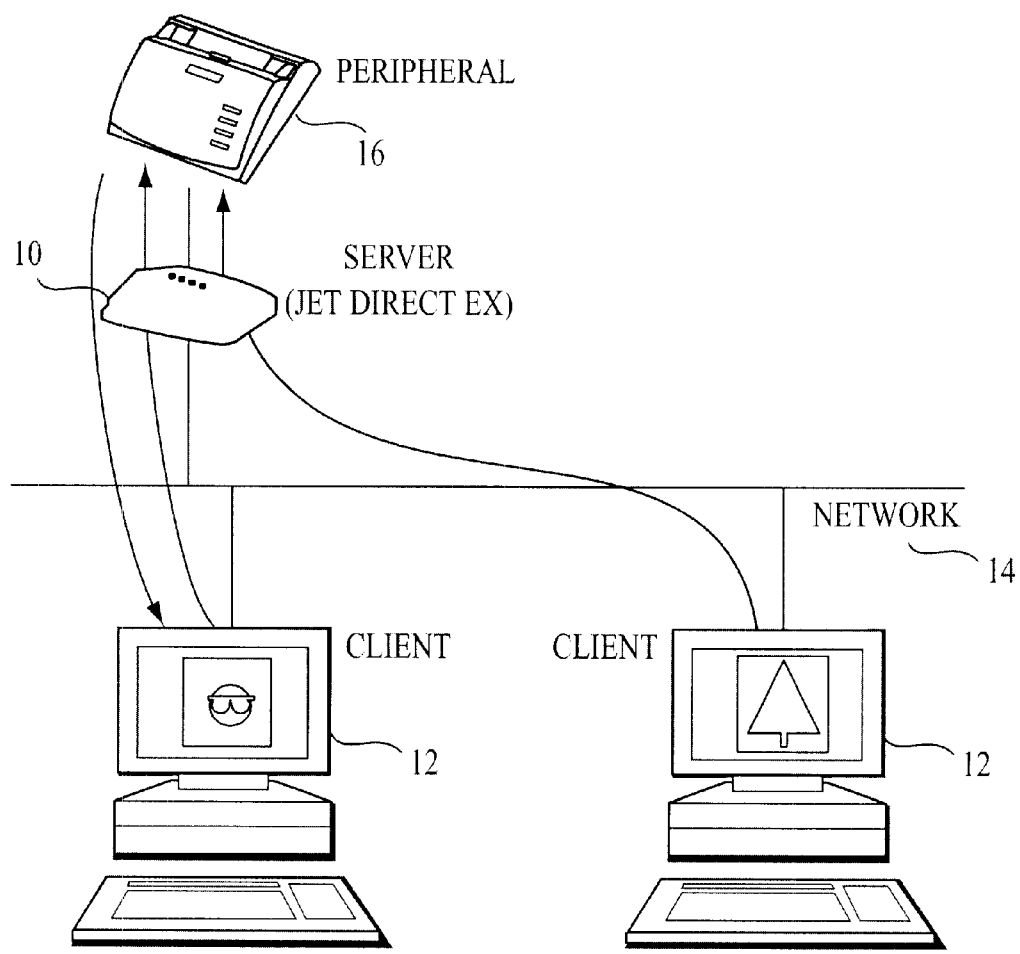
FIG. 1 is an overview of the network system.

Turning now to the drawings, and particularly FIG. 1, a server 10 of the present invention establishes a connection between a client 12 on a network 14 and a peripheral 16, such as a scanner. While the server 10 referred to is used as part of a Hewlett-Packard JETDIRECT EX box package, it is contemplated that the server 10 can be part of a card that connects via a bus interface to the peripheral 16, or as part of an internal central processing unit (CPU) of the peripheral 16. The JETDIRECT EX box is shown and described in a Hewlett-Packard user manual, part no. 5967-2290, and is incorporated by reference herein.

Figure 2:
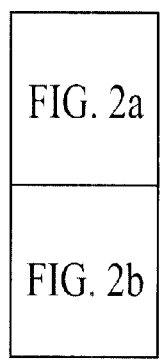
FIG. 2 is a flow chart of the present network server which can provide access prevention for datagram based protocols.
Figure 2A:
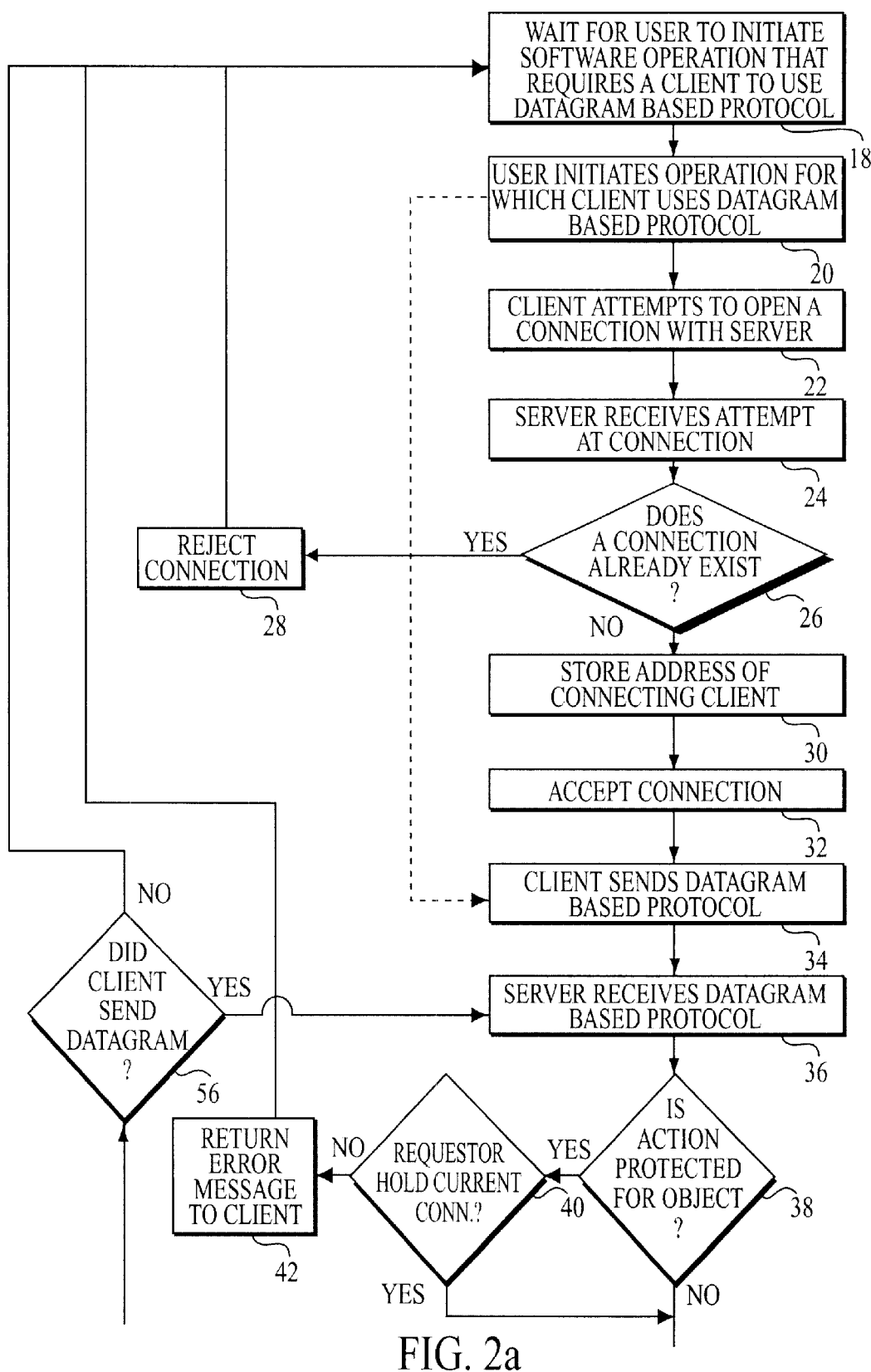
Figure 2B:
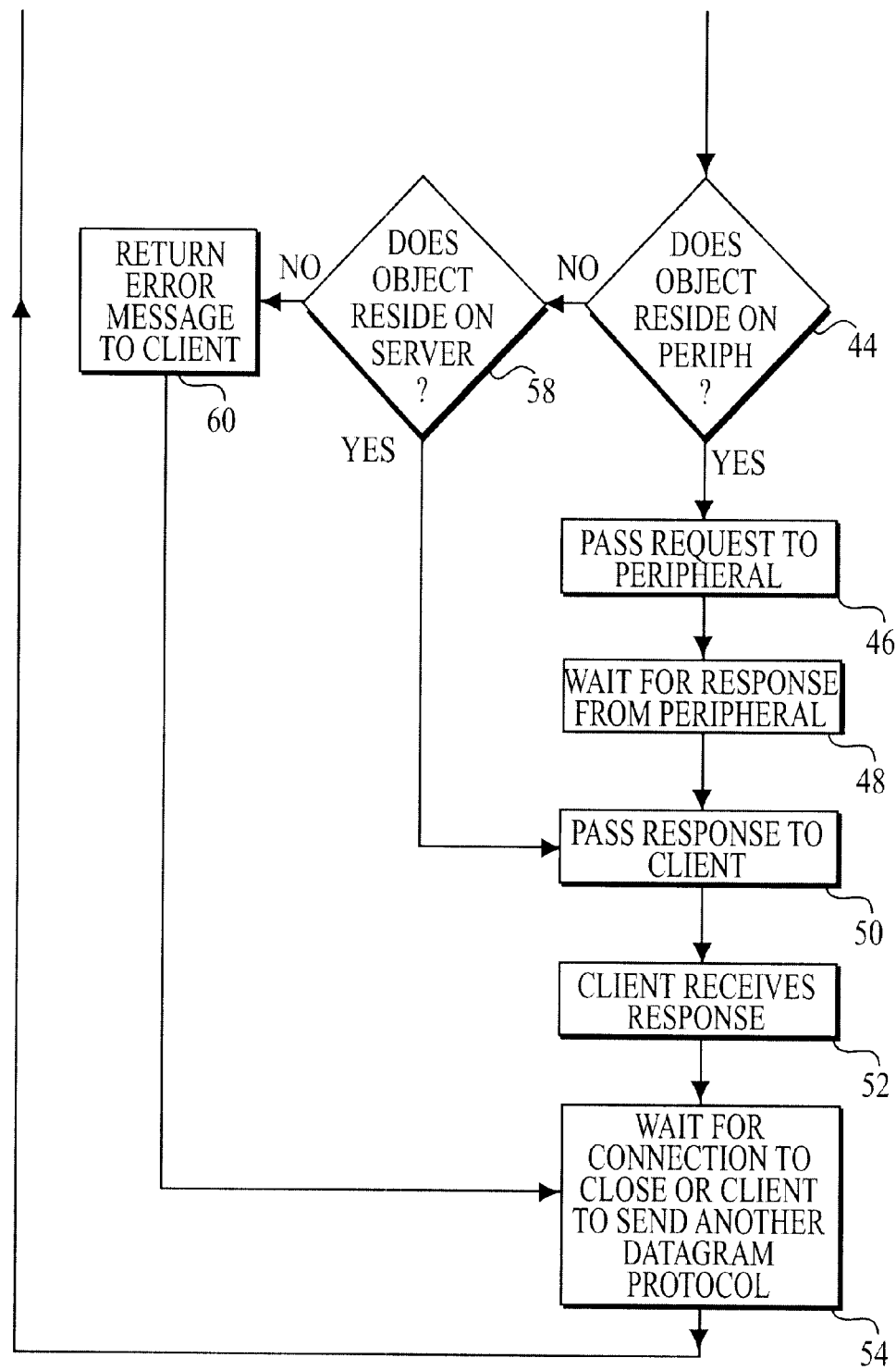

Referring to FIG. 2, the server 10 waits for a user to initiate a software operation that requires a client 12 to utilize a datagram based protocol such as SNMP (block 18). SNMP is a standard network protocol that is generally used for configuring and monitoring network devices. Typically, SNMP is used to send small packets of data, such as control data over a channel. Unlike connection oriented protocols that send a continuous stream of data in order, SNMP data packets may be received in a different order than they were sent out.

When the user initiates an operation for which the client 12 uses a datagram based protocol (block 20), the client attempts to open a connection with the server 10 using a connection oriented protocol such as TCP or SPX, depending on the network 14, by sending a packet to open the connection (block 22). The server 10 receives the attempted connection when the packet comes over the network 14 (block 24). The server 10 checks an internal state machine to determine if an active connection presently exists (block 26). If a connection already exists, the server 10 rejects the connection (block 28), and waits for a user to initiate a software operation that requires a client to use a datagram based protocol (block 18).

If a connection does not already exist, the server 10 stores an address of the connecting client as a variable in memory on the server 10 (block 30). The server 10 accepts the connection by sending an appropriate packet (block 32). Subsequently, the server 10 allows the client 12 to send information using the datagram based protocol (block 34). The server 10 receives the datagram based protocol when the packet comes across the network 14 (block 36).

Importantly, the server 10 next determines whether an action requested by the datagram based protocol is a protected action (block 38). A set action, for example, is a protected action since the datagram based protocol is requesting to change an object. A get action, however, is normally not a protected action since the datagram based protocol only requires to look at an object. Types of objects may include, but are not limited to, a scan owner name, a scan owner address, a state of the scanner, and scanner configuration.

Thus, if the client 12 requests a protected action, the server 10 determines whether the requestor is the current connection holder, preferably by looking at the requestor's source address and comparing it to the earlier stored address (block 40). If the requester is not the current connection holder, the server 10 returns an error message to the client 12 using the datagram based protocol (block 42). This could occur if the client software or the user fails to establish a connection before sending the datagram, as shown with a dashed line (blocks 20, 34). Thus, the client 12 is unable to illegally send datagram based protocol requests.

If the requestor is the current connection holder (block 40), or the action is not a protected action (block 38), then the server 10 determines whether the desired object resides on the peripheral 16 (block 44). If the object resides on the peripheral 16, the server 10 converts the request, if required, to peripheral management language (PML) or some other language that the peripheral 16 understands, and passes the request to the peripheral 16 (block 46). After receiving a response from the peripheral 16 (block 48), the server 10 converts the response to the datagram based protocol if required (block 50) and sends the response to the client 12. Thereafter, the client 12 receives the response (block 52) and waits for the server 10 or the client 12 to close the connection, or for the client 12 to send another datagram based protocol request (block 54).

Depending on whether the client 12 sends a datagram to the server 10 (block 56), the server 10 either receives the datagram based protocol (block 36) or waits for the user to initiate a software application that requires a client 12 to use a datagram based protocol (block 18).

If the server receives the datagram based protocol (block 36), the requested action is not protected (block 38), and the object does not reside on the peripheral 16 (block 44), then the server 10 determines whether the object resides on the server 10 (block 58). If the object resides on the server 10, the server 10 sends the object to the client 12 (block 50). Otherwise, the server 10 returns an error message stating that the object does not reside on the peripheral or the server (block 60). After either sending the object to the client 12 (block 50) or returning the error message (block 60), the server 10 waits for the connection to close, or for the client 12 to send another datagram protocol (block 54).

From the foregoing description, it should be understood that an improved server 10 has been shown and described which has many desirable attributes and advantages. The present invention provides an improved server method that utilizes a connectionless protocol for control data and a connection oriented protocol for scan data. Further, the present invention provides a method that uses a connection oriented protocol to grant access to objects referenced by a connectionless protocol, and handles network contention.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method of preventing access by multiple clients by datagram-based control protocols on a network having at least one scan peripheral and a server, wherein the server utilizes a connectionless protocol for communicating control data and a connection oriented protocol for communicating scan data, the method comprising the steps of:

a first client sending an open connection request to the server in an attempt to open a connection with the server;

the server checking to determine if a connection with another client is currently open;

the server rejecting the open connection request in the event a connection is currently open;

the server accepting the connection request and storing predetermined client information in the event a connection with another client is not currently open;

the client sending a datagram-based protocol request for a predetermined action to the server;

the server determining if said predetermined action is a protected action and whether the request is from the client that has the currently open connection;

the server sending an error message to any client not having a currently open connection which makes a datagram-based protocol request for a protected action;

the server processing a datagram-based protocol request when made by the client having a currently open connection; and either the client or the server closing said open connection upon completion of an activity.

2. A method as defined in claim 1 wherein said datagram-based control protocol is simple network management protocol (SNMP).

3. A method as defined in claim 1 wherein said datagram-based control protocol is user datagram protocol (UDP).

4. A method as defined in claim 1 wherein said datagram-based control protocol is internetwork packet exchange (IPX).

5. A method as defined in claim 1 wherein said connection is achieved with TCP/IP.

6. A method as defined in claim 5 wherein said connection is achieved with SPX.

7. A method as defined in claim 1 wherein said predetermined client information is the client address.

8. A method as defined in claim 7 wherein said server determining whether the request is from the client that has a currently open connection is done by confirming that the client address is said stored address.

9. A method as defined in claim 1 wherein a protected action is one that changes an object.

10. A method as defined in claim 5 wherein a protected action excludes an action that acquires information.

11. A method as defined in claim 1 wherein the server determining step further includes, responsive to the server determining that the requested action is not protected and is not from the client that has the currently open connection, determining if the object involved in the request resides on the scan peripheral and if so, converts and passes the request to the scan peripheral, receives the response and sends the response to the client making the request.

12. A method as defined in claim 1 wherein the server determining step further includes, responsive to the server determining that the requested action is from the client that has the currently open connection, determining if the object involved in the request resides on the scan peripheral and if so, converts and passes the request to the scan peripheral, receives the response and sends the response to the client making the request.

13. A method of preventing multiple client access via Simple Network Management Protocol (SNMP) on a network having at least one scan peripheral and a server, wherein the server utilizes SNMP for communicating control data and one of Sequence Packet Exchange (SPX) and Transmission Control Protocol/Internet Protocol (TCP/IP) for communicating scan data, the method comprising the steps of:

- a first client sending one of a TCP/IP and SPX request to the server in an attempt to open a connection with the server;
- the server determining if a connection with another client is currently open;
- the client sending a SNMP request for a predetermined action to the server;
- the server determining if said predetermined action is a protected action and whether the request is from the client that has the currently open connection;
- the server sending an error message to any client not having a currently open connection which makes a SNMP request for a protected action;
- the server processing a SNMP request when made by the client having a currently open connection;
- the server accepting the connection request and storing predetermined client information in the event a connection with another client is not currently open and rejecting the connection request in the event a connection is currently open; and
- either the client or the server closing said open connection upon completion of an activity.

14. A method as defined in claim 13 wherein the server determining step further includes, responsive to the server determining that the requested action is not protected and is not from the client that has the currently open connection, determining if the object involved in the request resides on the scan peripheral and if so, converts and passes the request to the scan peripheral, receives the response and sends the response to the client making the request.

15. A method as defined in claim 13 wherein said predetermined client information is the client address.

16. A method as defined in claim 15 wherein said server determining whether the request is from the client that has a currently open connection is done by confirming that the client address is said stored address.

17. A method of preventing access by multiple clients by datagram-based control protocols on a network having at least one scan peripheral and a server, wherein the server utilizes a connectionless protocol for communicating control data and a connection oriented protocol for communicating scan data, the method comprising the steps of:

- a first client sending an open connection request to the server in an attempt to open a connection with the server;
- the server checking to determine if a connection with another client is currently open;
- the server rejecting the open connection request in the event a connection is currently open;
- the server accepting the connection request and storing predetermined client information in the event a connection with another client is not currently open;
- the client sending a datagram-based protocol request for a predetermined action to the server;
- the server determining if said predetermined action is a protected action and whether the request is from the client that has the currently open connection, wherein a protected action is one that changes an object;
- the server sending an error message to any client not having a currently open connection which makes a datagram-based protocol request for a protected action;
- the server processing a datagram-based protocol request when made by the client having a currently open connection; and
- either the client or the server closing said open connection upon completion of an activity.

18. A method as defined in claim 17 wherein a protected action excludes an action that merely acquires information.

* * * * *